(12) United States Patent  (10) Patent No.: US 7,573,501 B2
Silverbrook  (45) Date of Patent: Aug. 11, 2009

(54) CAMERA WITH SWIPE PRINTER

(75) Inventor: Kia Silverbrook, Balmain (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 635 days.

(21) Appl. No.: 10/503,897

(22) PCT Filed: Feb. 12, 2003

(86) PCT No.: PCT/AU03/00153

§ 371 (c)(1),
(2), (4) Date: Aug. 9, 2004

(87) PCT Pub. No.: WO03/069892

PCT Pub. Date: Aug. 21, 2003

(65) Prior Publication Data

US 2005/0088527 A1 Apr. 28, 2005

(30) Foreign Application Priority Data

Feb. 13, 2002 (AU) .................................. PS 0488

(51) Int. Cl.
H04N 5/225 (2006.01)
(52) U.S. Cl. .................................. 348/207.2; 348/373
(58) Field of Classification Search ............. 348/207.2, 348/373, 552; 347/2; 358/906, 909.1, 296; 399/25
See application file for complete search history.

(56) References Cited

U.S. PATENT DOCUMENTS

| 4,837,628 | A | * | 6/1989 | Sasaki | 348/220.1 |
| 4,947,262 | A | * | 8/1990 | Yajima et al. | 358/296 |
| 5,593,236 | A | * | 1/1997 | Bobry | 400/88 |
| 5,883,653 | A |   | 3/1999 | Sasaki et al. | |
| 5,887,992 | A | * | 3/1999 | Yamanashi | 400/88 |
| 5,988,900 | A |   | 11/1999 | Bobry | |
| 5,999,203 | A |   | 12/1999 | Cane et al. | |
| 6,229,565 | B1 | * | 5/2001 | Bobry | 348/207.99 |
| 6,290,349 | B1 |   | 9/2001 | Silverbrook et al. | |
| 6,317,192 | B1 | * | 11/2001 | Silverbrook et al. | 355/18 |
| 2001/0000172 | A1 |   | 4/2001 | Barrus et al. | |
| 2002/0011558 | A1 |   | 1/2002 | Neukermans et al. | |

FOREIGN PATENT DOCUMENTS

| DE | 4444295 A1 | 6/1996 |
| EP | 0382044 | 8/1990 |
| EP | 0720915 A | 7/1996 |
| EP | 1080917 A1 | 3/2001 |

(Continued)

OTHER PUBLICATIONS

"HEDR-8000 Series Reflective Optical Surface Mount Encoders Data Sheet," May 2006, Avago Technologies, p. 2.*

(Continued)

Primary Examiner—Lin Ye
Assistant Examiner—Nelson D Hernández Hernández

(57) ABSTRACT

A digital camera has a built-in printer to enable the printing of a stored image upon a page external to the camera as the camera traverses the page. The camera can be maintained compact and lightweight as no paper storage or paper feed mechanism need be provided. A replaceable ink cartridge that detachable connects to the printhead reduces the costs of ongoing consumables.

8 Claims, 9 Drawing Sheets

FOREIGN PATENT DOCUMENTS

| | | |
|---|---|---|
| JP | 62-245857 A | 10/1987 |
| JP | 2001-144459 | 5/2001 |
| JP | 2001-169222 | 6/2001 |
| WO | WO 00/71348 A1 | 11/2000 |

OTHER PUBLICATIONS

Krishnan, RS; Lugaresi, TJ; Ruh, R; "a Miniture Surface Mount Reflective Optical Shaft Encoder", Hewlett-Packard Journal, Dec. 1996, XP000685944.

* cited by examiner

CAMERA WITH SWIPE PRINTER

CROSS REFERENCES TO RELATED APPLICATIONS

The present application is a 371 of PCT/AU03/00153 filed on Feb. 12, 2003.

FIELD OF THE INVENTION

The following invention relates to digital camera technology. More particularly, though not exclusively, the invention relates to a digital camera having a built-in printer. Such a printer might be a drop-on-demand printer utilizing a fixed printhead system.

BACKGROUND

Known digital cameras have some form of removable memory storage device such as a floppy disk or memory card. In order to print an image from the camera, the data in such storage devices must be uploaded to a computer to which them might be attached a peripheral printer.

Known digital cameras have no means of providing an "instant" print-out of an image photographed thereby.

The mere incorporation into a camera body of a known printer device would not result in a compact, easily portable camera. This is because prior art printers incorporate a supply of print media and employ a print media feed mechanism to transport the print media past the printheads to effect printing onto the print media. As such, known printers, having a supply of print media, are larger and heavier than would be desirable in a portable camera.

CO-PENDING APPLICATIONS

Various methods, systems and apparatus relating to the present invention are disclosed in the following co-pending applications filed by the applicant or assignee of the present invention on 12 Feb. 2003:

| | | | |
|---|---|---|---|
| PCT/AU03/00154 | PCT/AU03/00151 | PCT/AU03/00150 | PCT/AU03/00145 |
| PCT/AU03/00153 | PCT/AU03/00152 | PCT/AU03/00168 | PCT/AU03/00169 |
| PCT/AU03/00170 | PCT/AU03/00162 | PCT/AU03/00146 | PCT/AU03/00159 |
| PCT/AU03/00171 | PCT/AU03/00149 | PCT/AU03/00167 | PCT/AU03/00158 |
| PCT/AU03/00147 | PCT/AU03/00166 | PCT/AU03/00164 | PCT/AU03/00163 |
| PCT/AU03/00165 | PCT/AU03/00160 | PCT/AU03/00157 | PCT/AU03/00148 |
| PCT/AU03/00156 | PCT/AU03/00155 | | |

The disclosures of these co-pending applications are incorporated herein by cross-reference.

RELATED PATENT APPLICATIONS AND PATENTS

| | | | |
|---|---|---|---|
| U.S. Pat. No. 6,227,652 | U.S. Pat. No. 6,213,588 | U.S. Pat. No. 6,213,589 | U.S. Pat. No. 6,231,163 |
| U.S. Pat. No. 6,247,795 | U.S. Pat. No. 6,394,581 | U.S. Pat. No. 6,244,691 | U.S. Pat. No. 6,257,704 |
| U.S. Pat. No. 6,416,168 | U.S. Pat. No. 6,220,694 | U.S. Pat. No. 6,257,705 | U.S. Pat. No. 6,247,794 |
| U.S. Pat. No. 6,234,610 | U.S. Pat. No. 6,247,793 | U.S. Pat. No. 6,264,306 | U.S. Pat. No. 6,241,342 |
| U.S. Pat. No. 6,247,792 | U.S. Pat. No. 6,264,307 | U.S. Pat. No. 6,254,220 | U.S. Pat. No. 6,234,611 |
| U.S. Pat. No. 6,302,528 | U.S. Pat. No. 6,283,582 | U.S. Pat. No. 6,239,821 | U.S. Pat. No. 6,338,547 |
| U.S. Pat. No. 6,247,796 | U.S. Pat. No. 09/113,122 | U.S. Pat. No. 6,390,603 | U.S. Pat. No. 6,362,843 |
| U.S. Pat. No. 6,293,653 | U.S. Pat. No. 6,312,107 | U.S. Pat. No. 6,227,653 | U.S. Pat. No. 6,234,609 |
| U.S. Pat. No. 6,238,040 | U.S. Pat. No. 6,188,415 | U.S. Pat. No. 6,227,654 | U.S. Pat. No. 6,209,989 |
| U.S. Pat. No. 6,247,791 | U.S. Pat. No. 6,336,710 | U.S. Pat. No. 6,217,153 | U.S. Pat. No. 6,416,167 |
| U.S. Pat. No. 6,243,113 | U.S. Pat. No. 6,283,581 | U.S. Pat. No. 6,247,790 | U.S. Pat. No. 6,260,953 |
| U.S. Pat. No. 6,267,469 | U.S. Pat. No. 6,273,544 | U.S. Pat. No. 6,309,048 | U.S. Pat. No. 6,420,196 |
| U.S. Pat. No. 6,443,558 | U.S. Pat. No. 09/422,892 | U.S. Pat. No. 6,378,989 | U.S. Pat. No. 09/425,420 |
| U.S. Pat. No. 09/422,893 | U.S. Pat. No. 09/609,140 | U.S. Pat. No. 6,409,323 | U.S. Pat. No. 6,281,912 |
| U.S. Pat. No. 09/575,113 | U.S. Pat. No. 6,318,920 | U.S. Pat. No. 6,488,422 | U.S. Pat. No. 09/693,644 |
| U.S. Pat. No. 6,457,810 | U.S. Pat. No. 6,485,135 | U.S. Pat. No. 09/112,763 | U.S. Pat. No. 6,331,946 |
| U.S. Pat. No. 6,246,970 | U.S. Pat. No. 6,442,525 | U.S. Pat. No. 09/505,951 | U.S. Pat. No. 09/505,147 |
| U.S. Pat. No. 09/505,952 | U.S. Pat. No. 09/575,108 | U.S. Pat. No. 09/575,109 | U.S. Pat. No. 09/575,110 |
| U.S. Pat. No. 09/607,985 | U.S. Pat. No. 6,398,332 | U.S. Pat. No. 6,394,573 | U.S. Pat. No. 09/606,999 |
| U.S. Pat. No. 6,238,044 | U.S. Pat. No. 6,425,661 | U.S. Pat. No. 6,390,605 | U.S. Pat. No. 6,322,195 |
| U.S. Pat. No. 09/504,221 | U.S. Pat. No. 6,480,089 | U.S. Pat. No. 6,460,778 | U.S. Pat. No. 6,305,788 |
| U.S. Pat. No. 6,426,014 | U.S. Pat. No. 6,364,453 | U.S. Pat. No. 6,457,795 | U.S. Pat. No. 09/556,219 |
| U.S. Pat. No. 09/556,218 | U.S. Pat. No. 6,315,399 | U.S. Pat. No. 6,338,548 | U.S. Pat. No. 09/575,190 |
| U.S. Pat. No. 6,328,431 | U.S. Pat. No. 6,328,425 | U.S. Pat. No. 09/575,127 | U.S. Pat. No. 6,383,833 |
| U.S. Pat. No. 6,464,332 | U.S. Pat. No. 6,390,591 | U.S. Pat. No. 09/575,152 | U.S. Pat. No. 6,328,417 |
| U.S. Pat. No. 6,322,194 | U.S. Pat. No. 09/575,177 | U.S. Pat. No. 09/575,175 | U.S. Pat. No. 6,417,757 |
| U.S. Pat. No. 09/608,780 | U.S. Pat. No. 6,428,139 | U.S. Pat. No. 09/607,498 | U.S. Pat. No. 09/693,079 |
| U.S. Pat. No. 09/693,135 | U.S. Pat. No. 6,428,142 | U.S. Pat. No. 09/692,813 | U.S. Pat. No. 09/693,319 |
| U.S. Pat. No. 09/693,311 | U.S. Pat. No. 6,439,908 | U.S. Pat. No. 09/693,735 | PCT/AU98/00550 |
| PCT/AU00/00516 | PCT/AU00/00517 | PCT/AU00/00511 | PCT/AU00/00754 |
| PCT/AU00/00755 | PCT/AU00/00756 | PCT/AU00/00757 | PCT/AU00/00095 |
| PCT/AU00/00172 | PCT/AU00/00338 | PCT/AU00/00339 | PCT/AU00/00340 |
| PCT/AU00/00341 | PCT/AU00/00581 | PCT/AU00/00580 | PCT/AU00/00582 |
| PCT/AU00/00587 | PCT/AU00/00588 | PCT/AU00/00589 | PCT/AU00/00583 |
| PCT/AU00/00593 | PCT/AU00/00590 | PCT/AU00/00591 | PCT/AU00/00592 |
| PCT/AU00/00584 | PCT/AU00/00585 | PCT/AU00/00586 | PCT/AU00/00749 |
| PCT/AU00/00750 | PCT/AU00/00751 | PCT/AU00/00752 | PCT/AU01/01332 |
| PCT/AU01/01318 | PCT/AU00/01513 | PCT/AU00/01514 | PCT/AU00/01515 |
| PCT/AU00/01516 | PCT/AU00/01517 | PCT/AU00/01512 | PCT/AU01/00502 |
| PCT/AU02/01120 | PCT/AU00/00333 | PCT/AU01/00141 | PCT/AU01/00139 |

-continued

RELATED PATENT APPLICATIONS AND PATENTS

| | | | |
|---|---|---|---|
| PCT/AU01/00140 | PCT/AU00/00753 | PCT/AU01/01321 | PCT/AU01/01322 |
| PCT/AU01/01323 | PCT/AU00/00594 | PCT/AU00/00595 | PCT/AU00/00596 |
| PCT/AU00/00597 | PCT/AU00/00598 | PCT/AU00/00741 | PCT/AU00/00742 |

DISCLOSURE OF THE INVENTION

According to one aspect of the invention there is disclosed a digital camera comprising:
 a housing;
 an image sensor adapted to capture an image;
 a digital storage device adapted to store digitally the image captured by the image sensor;
 a printer located within the housing, the printer having a printhead and is adapted to receive digital information corresponding to the captured image from the digital storage device;
 a replaceable ink cartridge for location in the housing and detachable connection to the printer;
 the printer is adapted to print the captured image on media external to the camera as the camera traverses the media.

Preferably, the camera further comprises a lens and wherein the image is captured by the image sensor via the lens.

Preferably, the printer comprises a drop-on-demand color inkjet printhead.

Preferably, the housing includes a receptacle having resilient collars and into which the ink cartridge is received, the cartridge including ink outlets adapted to engage with the collars.

Preferably, the digital storage device comprises a removable memory card.

Preferably, the memory card is stored within a chassis having an integrally formed battery housing adapted to receive and retain a battery for powering the camera.

Preferably, the camera further comprises a speed sensor adapted to sense the speed at which the camera traverses the media.

Preferably, the printer is adapted to be synchronised with the speed sensor such that the printer ejects ink onto the media at rate which is proportional to the speed at which the camera traverses the media in order to produce a faithful reproduction of the captured image.

Preferably, the speed sensor comprises:
 an optical encoder wheel having a plurality of markings disposed circumferentially thereon; and
 an optical sensor adapted to sense the markings as the optical encoder wheel is rotated in contact with the media.

BRIEF DESCRIPTION OF THE DRAWINGS

A preferred form of the present invention will now be described by way of example only with reference to the accompanying drawings, wherein.

DESCRIPTION OF THE PREFERRED EMBODIMENT

Figure 1:
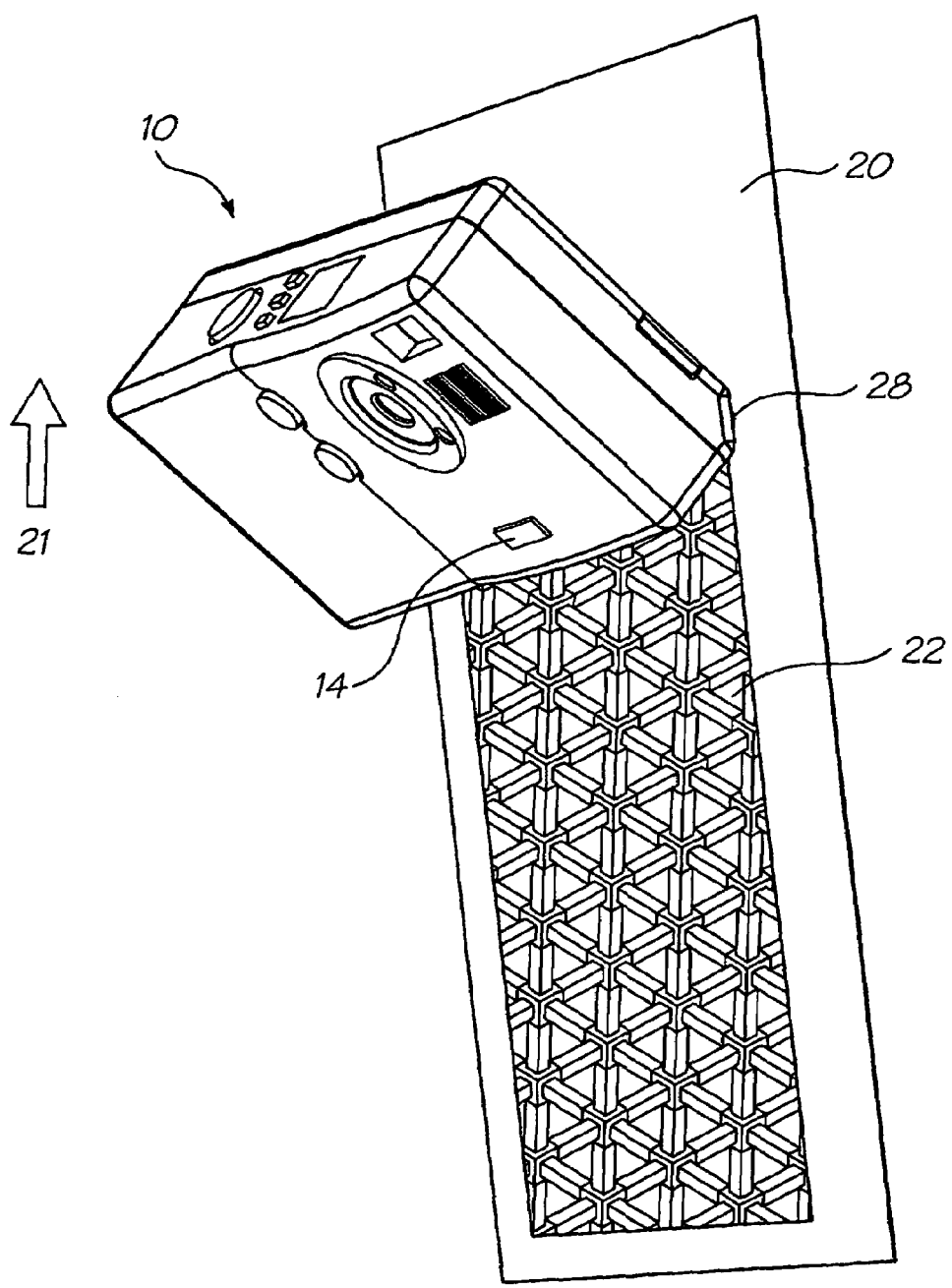
FIG. 1 is a perspective illustration of a camera having a built-in printer, in use traversing a print media to print an image thereon.

In FIG. 1 of the accompanying drawings there is shown a camera 10 being moved across blank print media 20 to print an image 22 thereon. The image is printed by a printer within the camera housing. The camera 10 is moved by a user in the direction indicated by arrow 21 after pressing a print enable button 14. The printer may comprise internal components similar to those disclosed in co-pending application filed concurrently herewith and entitled "Manually moveable printer with speed sensor" referred to above.

Figure 2:
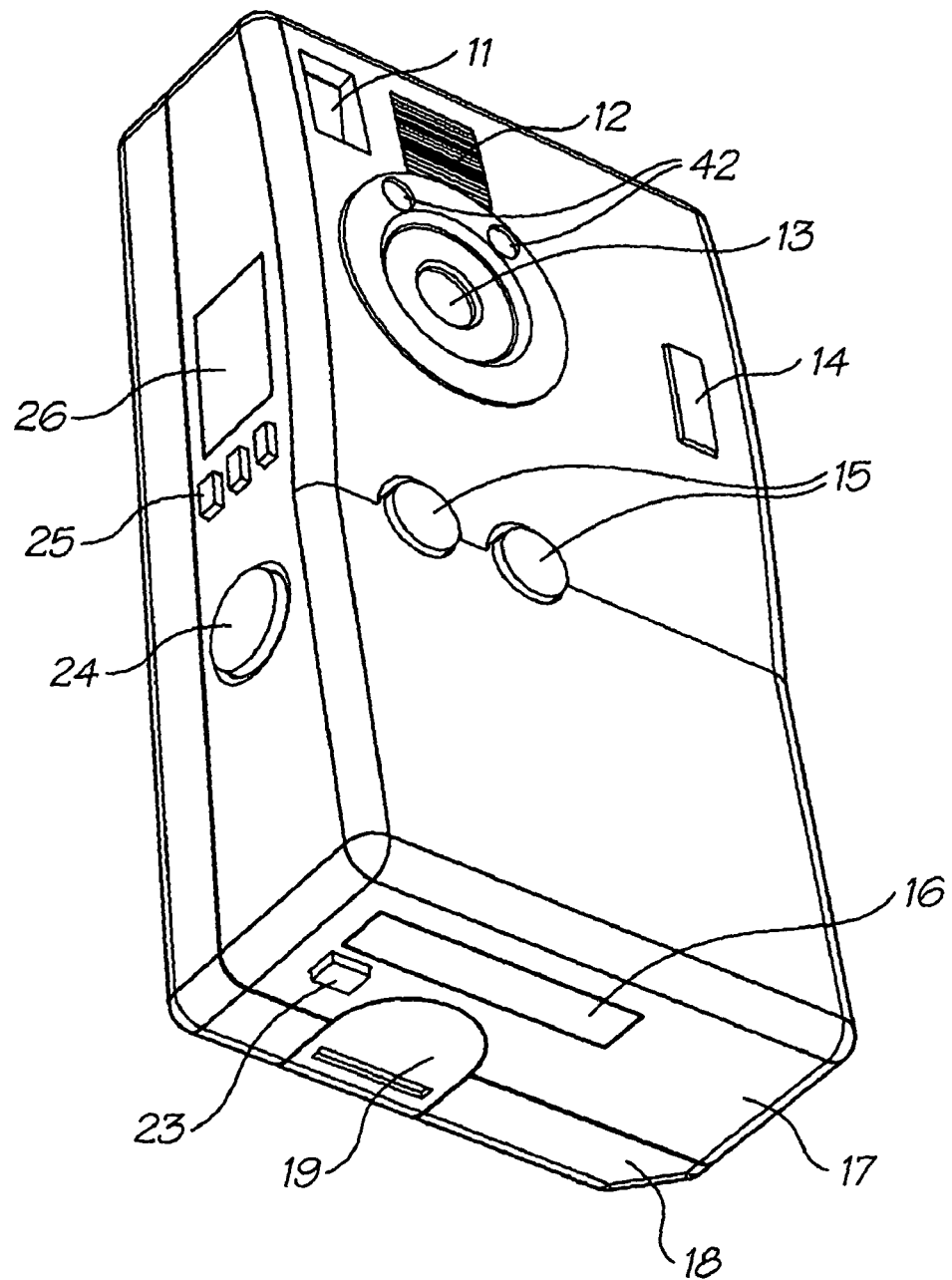
FIG. 2 is a perspective view of the front of the camera.

As shown in FIG. 2, the camera 10 includes a view finder 11, a flash unit 12 and a zoom lens 13. Operation of the zoom lens 13 is by means of zoom button 15. Alongside the lens 13, there is a pair of auto-focus infra-red lenses 42 which serve to automatically focus the lens 13 in a conventional manner.

Digital images are captured by the camera by activation of take button 24. Available memory and other data is displayed on a liquid crystal display 26 and the camera 10 is provided with programming buttons 25 for various functional settings as is known in the art.

The camera incorporates a memory card behind memory card door 16, and a battery such as a CR2 battery behind battery cover 19. The memory card can be ejected from behind the memory card door 16 upon depressing card eject button 23.

Figure 3:
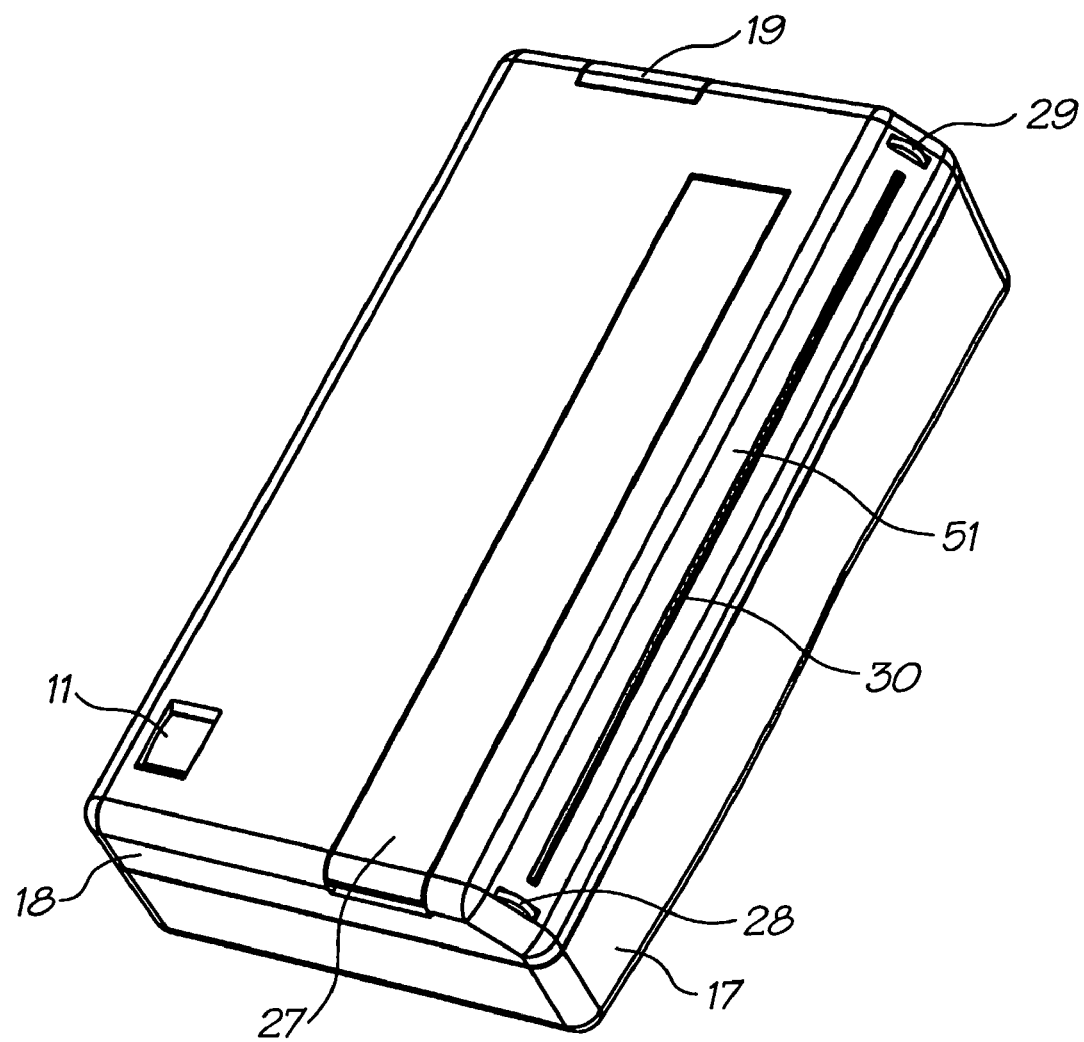
FIG. 3 is a perspective view of the rear of the camera.

As shown in FIG. 3, the camera body also houses a removable ink cartridge 27. FIG. 3 also shows the external features of the camera's printer. At the transition between the back and the base of the camera, there is an inclined surface 51. During a printing operation, this surface 51 is designed to be presented substantially parallel to the sheet of blank media 20. At one end, an optical encoder wheel 29 protrudes from the surface. At the other end, an idler wheel 28, protrudes from the surface. The optical encoder wheel has a plurality of circumferentially spaced makings thereon and an associated optical sensor adapted to sense those markings. As the camera is moved across the print media, the optical encoder wheel rolls across the print media and the optical sensor detects the speed at which the camera is being moved so that ink can be ejected from the printhead 30 at an appropriate rate to produce a faithful reproduction of the image captured by the camera. The idler wheel 28 has the same axis of rotation as the optical encoder wheel to help the camera to move in a straight line.

Further details of the operation of the optical encoder wheel 29 and idler wheel 28 can be found in co-pending application entitled "Manually moveable printer with speed sensor" referred to above.

Between the optical encoder wheel 29 and the idler wheel 28, there is disposed a printhead 30. This is preferably a photographic-width monolithic unit such as the "Memjet" printhead described in the cross-referenced patent applications.

Figure 4:
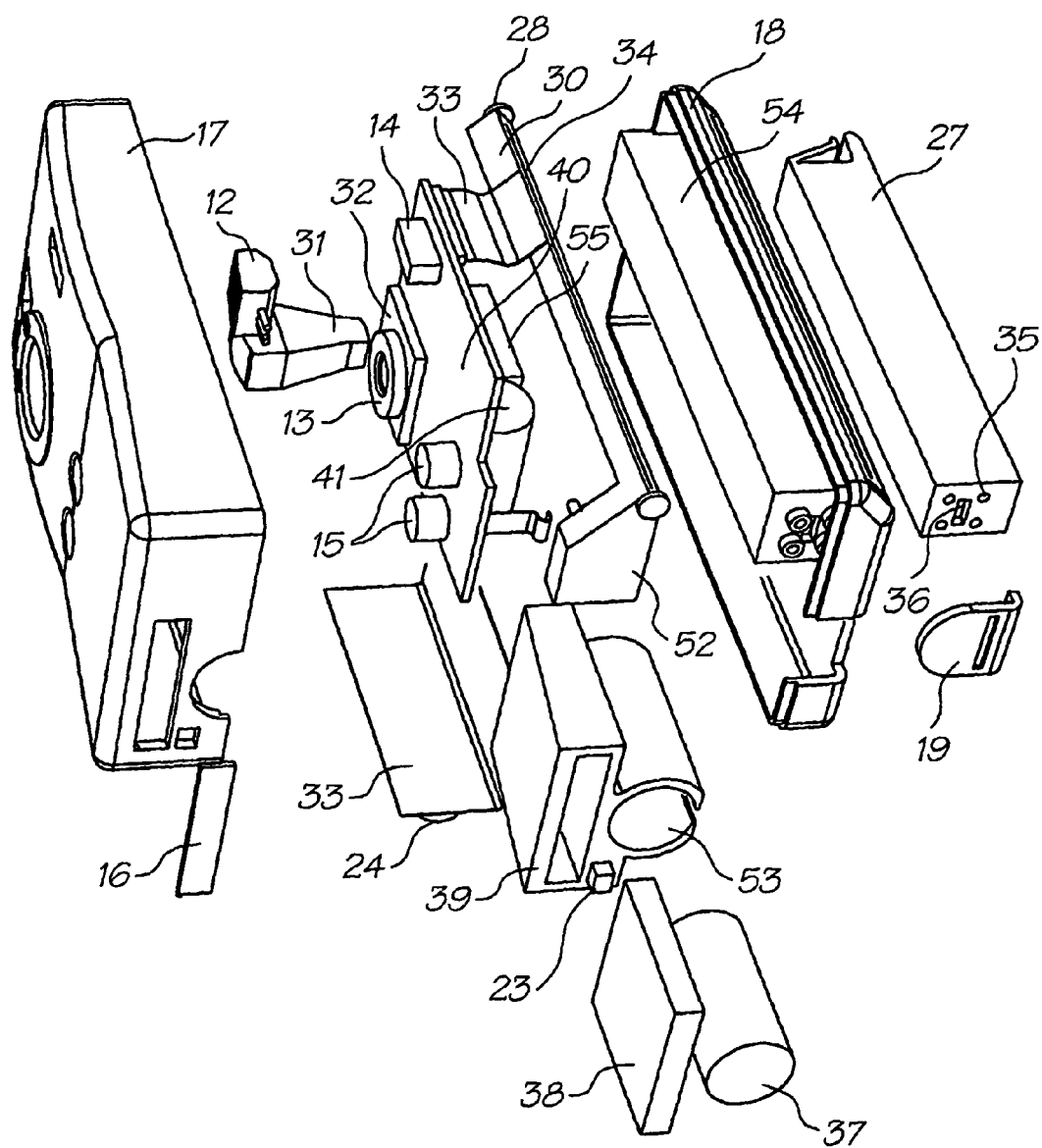
FIG. 4 is an exploded perspective illustration of the base of the camera.
Figure 5:
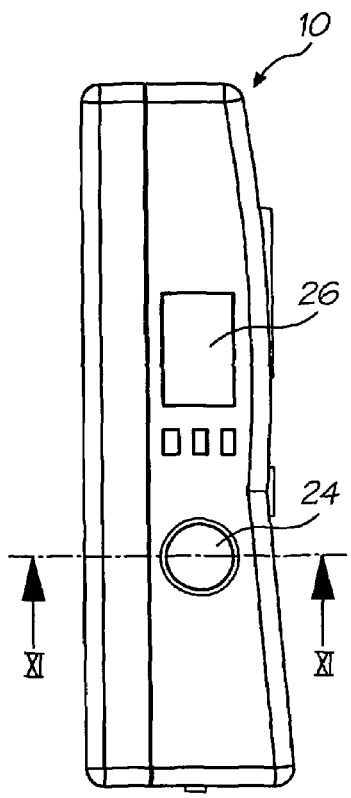
FIG. 5 is a plan view of the camera.
Figure 6:
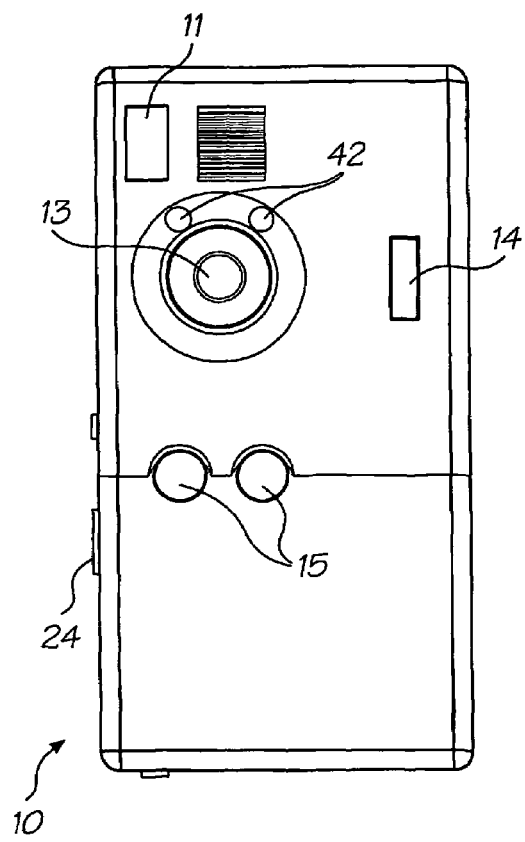
FIG. 6 is a front elevational view of the camera.
Figure 7:
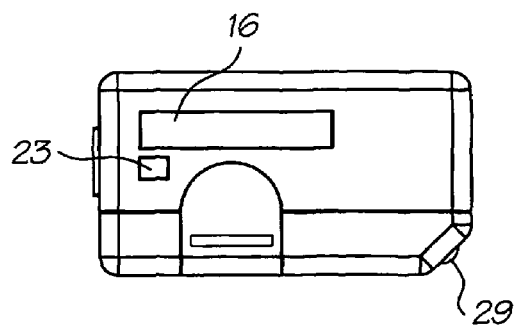
FIG. 7 is a right side elevational view of the camera.
Figures 8, 9:
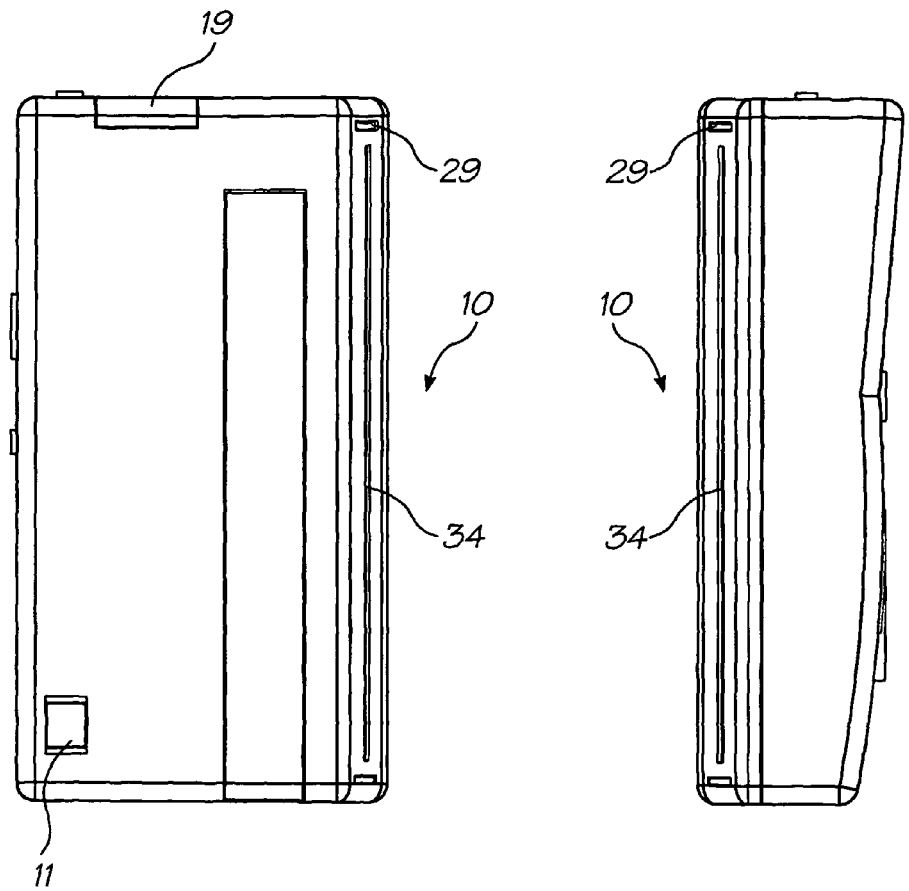
FIG. 8 is a rear elevational view of the camera.
FIG. 9 is an inverted plan view of the camera.
Figure 10:
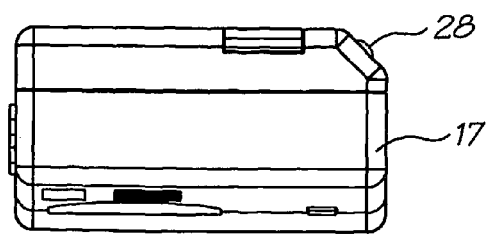
FIG. 10 is a left side elevational view of the camera.

An exploded perspective view of the camera assembly is shown in FIG. 4. The assembly incorporates a front plastics molding 17 and a rear plastics molding 18 between which the internal components of the camera and print engine are housed. As can be seen, the flash unit 12 is positioned adjacent a view finder molding 31 associated with view finder 11 (see FIG. 6). A digital zoom unit 32 is associated with the lens 13 and receives signals and power from the main printed circuit board 40 upon which it is mounted Behind the lens 13 and attached to the printed circuit board 40 is an image or 55 such as a charge coupled device (CCD) adapted to digitally capture an image, as is known in the art. Once captured, the digital information corresponding n to the captured image is stored in the memory cart 38.

The zoom activation buttons 15 are connected electrically to the main printed circuit board 40 as is a capacitor 41 which serves to energize the flash unit 12 when a picture is taken upon depression of the take button 24. The print button 14 is connected with the main printed circuit board. Data from the main printed circuit board is relayed to the printhead 30 via flexible printed circuit board 33.

Ink is delivered to the chip 34 of the printhead 30 via an ink connector 52 which receives ink from the ink cartridge 27.

A memory card chassis 39 serves to house the memory card 38. This card can be ejected from the chassis 39 by depression of an eject button 23. Molded integrally with the memory card chassis is a battery housing 53 which receives battery 37. The battery is covered by battery cover 19. The rear molding 18 has a receptacle 54 within which the ink cartridge 27 is received and retained. The ink cartridge 27 includes ink outlets 35 via which ink therefrom is communicated with the ink connector 52. Ink cartridge 27 also includes a quality assurance (QA) chip 36 communicating with the camera. In one form, the QA chip serves the dual purposes of authenticating the ink cartridge as being suitable for use with the camera as well as indicating the type or quantity of ink remaining in the cartridge.

Figure 11:
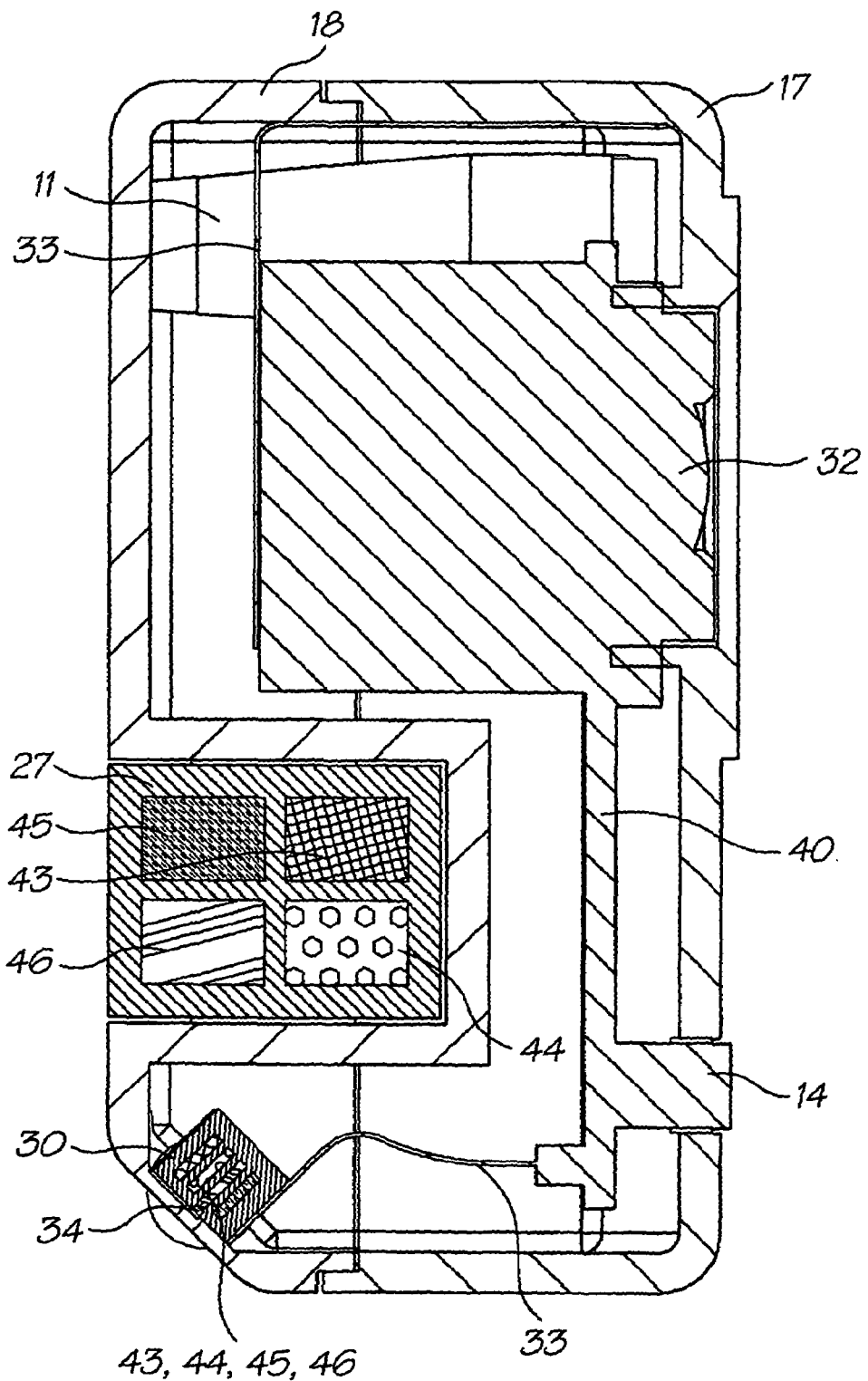
FIG. 11 is a cross-sectional side elevational view of the camera taken at XI-XI in FIG. 5.

FIG. 11 shows a typical internal arrangement of components within the camera body. As can be seen, data and power to the printhead unit 30 are conveyed by the flexible printed circuit board 33 from the main printed circuit board 40.

The ink cartridge 27 incorporates four internal longitudinal channels within which separate inks are stored. In this embodiment, there is black ink 45, yellow ink 46, cyan ink 43 and magenta ink 44. These are conveyed to the printhead unit 30 via the ink connector 52 (see FIG. 4).

Figure 12:
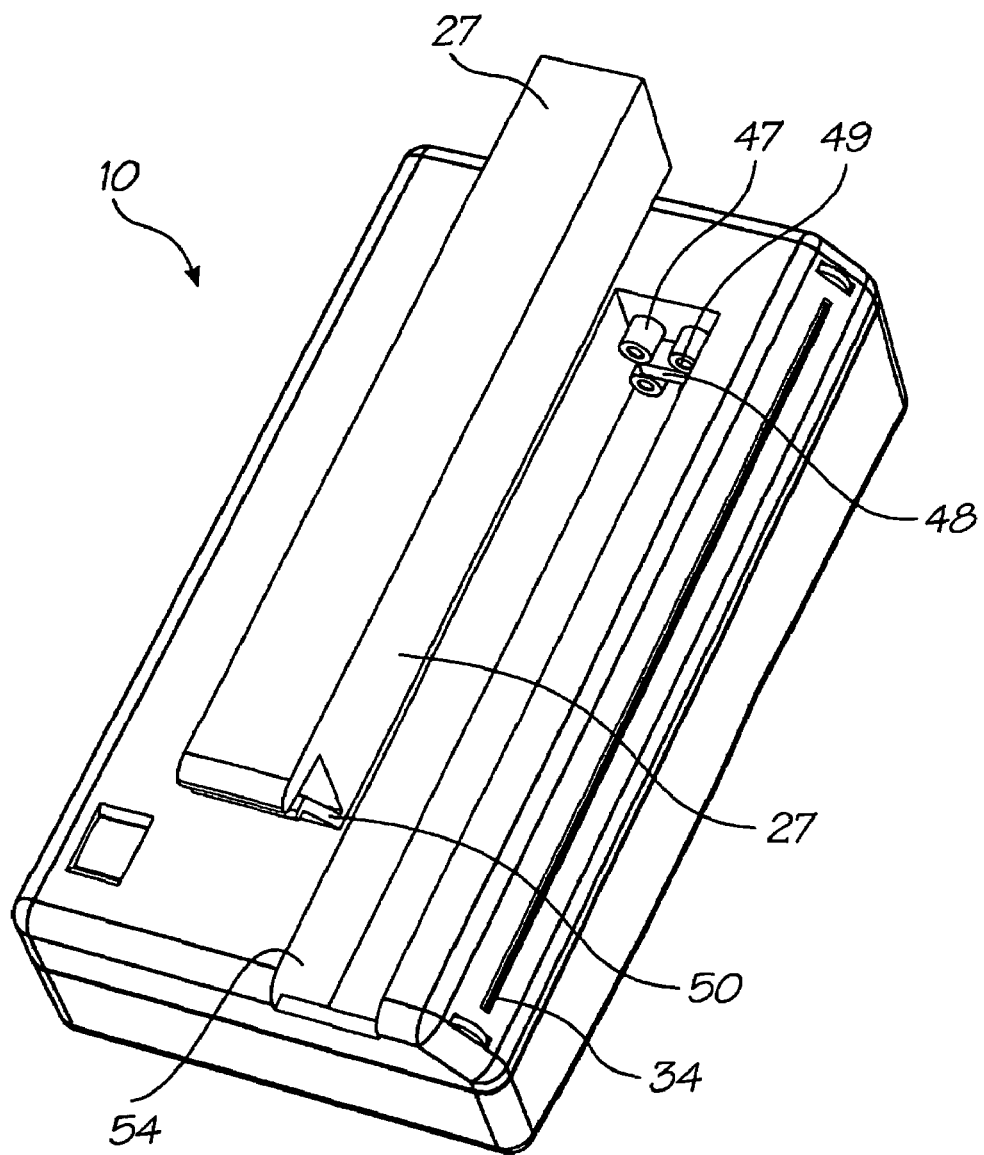
FIG. 12 is a perspective view of the rear of the camera showing an ink cartridge removed therefrom.

As can seen in FIG. 12, the ink cartridge 27 has a spring catch 50 formed at one of its ends. This spring catch biases the cartridge 27 within the receptacle 54 so as to present the ink outlets 35 in sealing engagement with the resilient collars 47 located at the other end of the receptacle. These collars 47 surround individual perforated metal pins 49 which communicate with the ink outlets 35. A chip contact block 48 communicates with the QA chip 36 located at the end of the ink cartridge 27.

Figure 13:
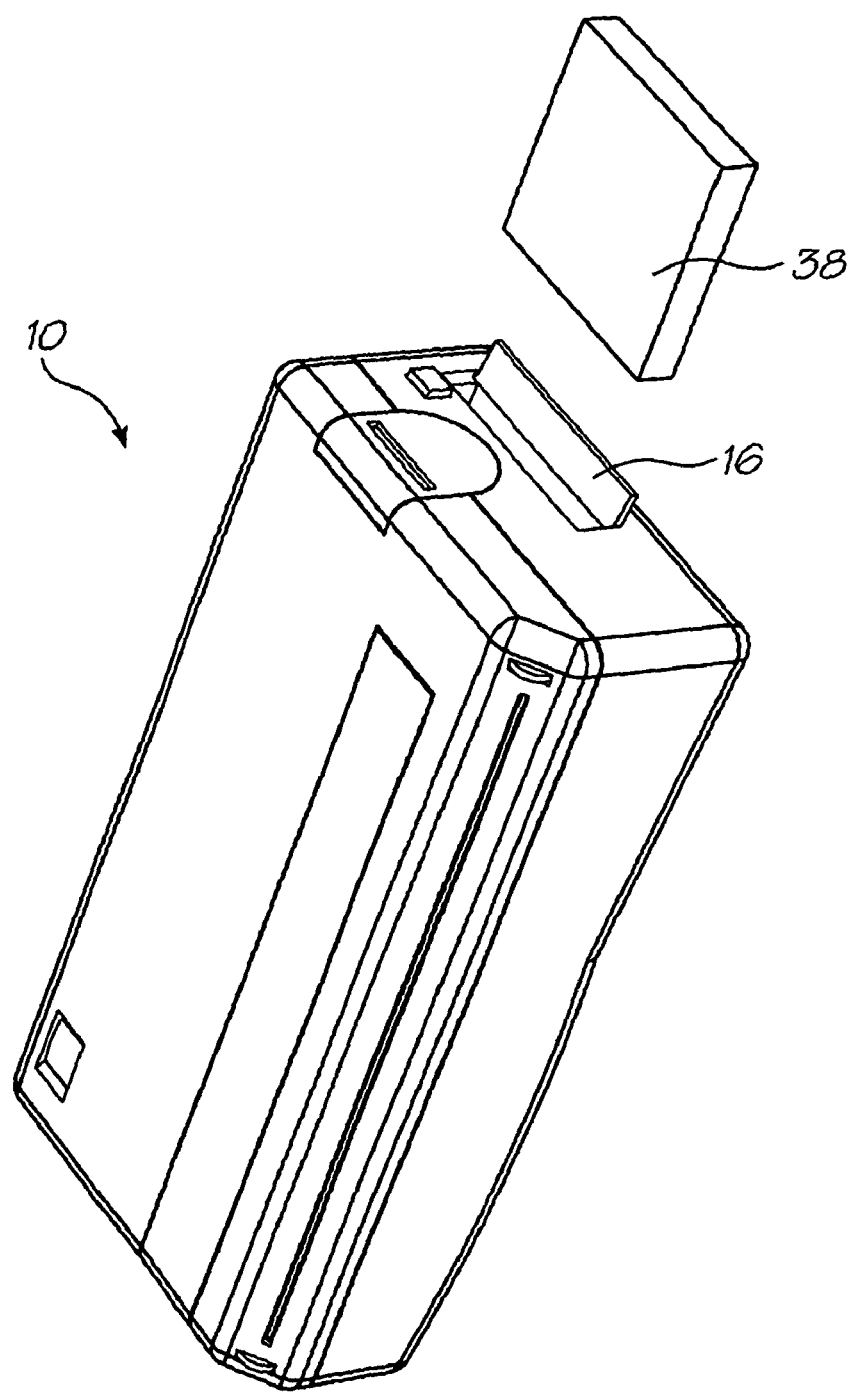
FIG. 13 is a further perspective view of the rear of the camera showing a memory card removed from a memory card chassis in the camera.

FIG. 13 depicts the camera 10 with the memory card door 16 open and the memory card 38 removed from the memory card chassis 39.

In use, the digital camera 10 is used in a conventional manner to take photographs. These photographs can be stored on the memory card for use later or may be printed instantly using the built-in printing device. When printing of a particular image stored in the memory card is desired, the programming buttons 25 can be manipulated to make a selection prior to printing. A print enable button 14 can then be depressed whereupon the user can swipe the camera across the blank print media 20 (as shown in FIG. 1) to effect image printing thereon.

It should be appreciated that modifications and alterations obvious to those skilled in the art not to be considered as beyond the scope of the present invention. For example, many different internal configurations of the various components can be chosen without departing from the overall spirit and scope of the invention. For example, the camera body can be provided with four wheels (one at each corner of a rectangle extending substantially over one face of the camera body) instead of two. One of the four wheels can be an optical encoder wheel. This way, the camera might be presented in a configuration normal to the blank page during the page-traversing printing procedure. The ink cartridge might be located alongside or above the printhead or in any other internal configuration depending upon the particular application.

I claim:

1. A digital camera comprising:
a housing having seven major surfaces, including a front surface, a rear surface, a base surface and an inclined surface adjoining the rear and base surfaces, the base surface being the surface on which the digital camera is supported at rest;
an image sensor for capturing an image, the image sensor provided on the front surface;
a digital storage device for digitally storing the image captured by the image sensor;
a printer located within the housing, the printer for printing the captured image on media external to the camera as the camera traverses the media, wherein a printhead of the printer is provided on the inclined surface and at an angle normal thereto;
a replaceable ink cartridge located within the housing and detachable therefrom, the replaceable ink cartridge being detachably inserted into the housing from the rear surface;
a speed sensor for sensing a speed at which the camera traverses the media, wherein the speed sensor comprises:
an optical encoder wheel protruding from the inclined surface at a normal thereto, and having a plurality of markings disposed circumferentially thereon;
an optical sensor for sensing the markings; and
an idle wheel protruding from the inclined surface at a normal thereto and provided at an opposite end of the inclined surface from the optical encoder wheel, the idle wheel for assisting the digital camera to traverse the media.

2. The camera of claim 1 wherein the camera further comprises a lens and wherein the image is captured by the image sensor via the lens.

3. The camera of claim 1 wherein the printer comprises a drop-on-demand color inkjet printhead.

4. The printer of claim 1 wherein the rear surface includes an elongate receptacle into which the ink cartridge is received, the elongate receptacle having resilient collars at one end thereof, and the cartridge including ink outlets for slidably engaging with the collars.

5. The camera of claim 1 wherein the digital storage device comprises a removable memory card.

6. The camera of claim 5 wherein the memory card is stored within a chassis having an integrally formed battery housing adapted to receive and retain a battery for powering the camera.

7. The camera of claim 1 wherein the printer is adapted to be synchronized with the speed sensor such that the printer ejects ink onto the media at rate which is proportional to the speed at which the camera traverses the media in order to produce a faithful reproduction of the captured image.

8. The camera of claim 1, wherein the replaceable ink cartridge comprises an authentication chip which, when received within the printer, communicates with the camera to indicate that the replaceable ink cartridge is suitable for use with the camera and at least one of indicating a type and quality of ink remaining in the cartridge.

* * * * *